United States Patent
Chen

(10) Patent No.: US 6,347,693 B1
(45) Date of Patent: Feb. 19, 2002

(54) ARTICLE-HOLDING HOOK OF LUGGAGE

(76) Inventor: Wei-Chih Chen, No. 59, Hen Chung St., Wu Chile Ta Chile Cheng, Taichung Hsien (TW)

( * ) Notice: Subject to any disclaimer, the term of this patent is extended or adjusted under 35 U.S.C. 154(b) by 0 days.

(21) Appl. No.: 09/562,084

(22) Filed: May 1, 2000

(51) Int. Cl.[7] .................................................. A45C 5/14
(52) U.S. Cl. ........................ 190/102; 24/599.5; 190/108
(58) Field of Search ................................ 190/102, 15.1, 190/108; 24/599.5

(56) References Cited

U.S. PATENT DOCUMENTS

| | | | | |
|---|---|---|---|---|
| 5,547,052 A | * | 8/1996 | Latshaw ..................... | 190/108 |
| 5,593,009 A | * | 1/1997 | King .......................... | 190/102 |
| 5,829,559 A | * | 11/1998 | Nordstrom et al. ......... | 190/102 |
| 5,842,673 A | * | 12/1998 | Fenton ..................... | 190/102 X |
| 6,141,841 A | * | 11/2000 | Workman ............... | 190/102 X |
| 6,209,179 B1 | * | 4/2001 | Shou-Mao .............. | 190/102 X |

* cited by examiner

*Primary Examiner*—Gary E. Elkins
(74) *Attorney, Agent, or Firm*—Harrison & Egbert

(57) ABSTRACT

An article-holding device is connected to the shell of a piece of luggage to facilitate the carrying of an article along with the luggage. The device is formed of a base plate, a hooked plate, and a fastening piece. The base plate is provided with two protruded blocks for fastening pivotally to the fastening piece, and a cross seat block for fastening pivotally to the hooked plate. The base plate is provided with a cross hole for enabling the hooked plate to swivel upward to connect to the base plate. The fastening piece is provided with a retaining hole and a folding hole. The hooked plate is provided in the underside with two retaining hooks to facilitate the folding or the unfolding of the hooked plate.

2 Claims, 8 Drawing Sheets

ARTICLE-HOLDING HOOK OF LUGGAGE

TECHNICAL FIELD

The present invention relates generally to luggage, and more particularly to an accessory of luggage.

BACKGROUND ART

As shown in FIG. 1, an article-holding hook 10 of the prior art is designed to be fastened with a luggage and is provided to a through hole 11 into which a fabric belt is inserted for fastening the hook 10 to the luggage. The hook 10 is fastened the outer surface of the luggage shell for carrying an article, such as a hand bag.

Such a prior art hook 10 as described above is defective in design because the hook 10 is devoid of a retainer for retaining securely the article, and because the hook 10 has a hook end 101 which is apt to catch a dress worn by a person, or a conveyor belt.

SUMMARY OF THE INVENTION

The primary objective of the present invention is to provide an article holder which is fastened to the external side of luggage to facilitate the carrying of a relatively smaller article, such as a hand bag.

The article holder of the present invention is formed of a base plate, a hooked plate, and a fastening piece.

The objective, features, and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
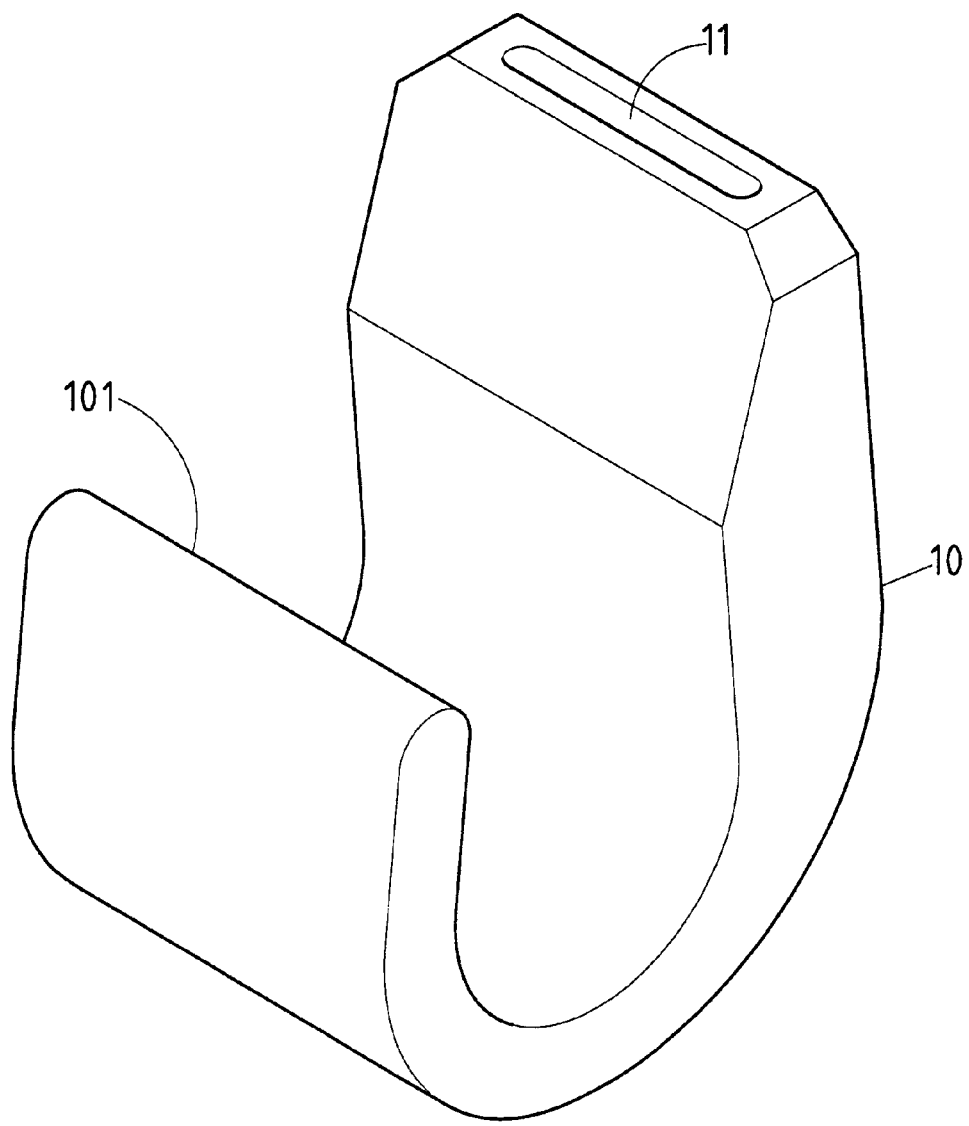
FIG. 1 shows a perspective view of an article-holding hook of the prior art.

As shown in FIGS. 2–8, an article-retaining device embodied in the present invention is fixed with the external side of a piece of luggage for carrying a relatively small article along with the luggage. The article-retaining device of the present invention is formed of a base plate 20, a hooked plate 30, and a fastening piece 41.

The base plate 20 is provided near the top thereof, with two protruded blocks 21, 22, which are provided respectively with a through hole 23, 24. The base plate 20 is provided with a cross hole 25 located under the protruded blocks 21 and 22. The base plate 20 is provided with a cross base block 26 extending downward in a slanting manner and having a through hole 27.

The hooked plate 30 is provided in the top thereof with two seat blocks 31 and 32, which are connected by a stop block 33 so as to form a slot 34 between the two seat blocks 31 and 32 for accommodating the cross base block 26 which is pivotally mounted between the seat blocks 31 and 32 by a pivot 35. The hooked plate 30 is provided with a hooked end 36 and a recess 37. The hooked plate 30 is provided in the underside thereof with a retaining hook 38. The hooked plate 30 is further provided with a hook 39 and a protruded edge 40.

The fastening piece 41 is made of a pliable material and is provided with a tubular portion 42, which is disposed between the two protruded blocks 21 and 22 such that the fastening piece 41 is pivotally mounted between the protruded blocks 21 and 22 by a pivot 43. The fastening piece 41 is provided with a retaining hole 44 and a folding hole 45.

The present invention may be formed of the base plate 20 and the hooked plate 30, without the fastening piece 41.

Figure 7:
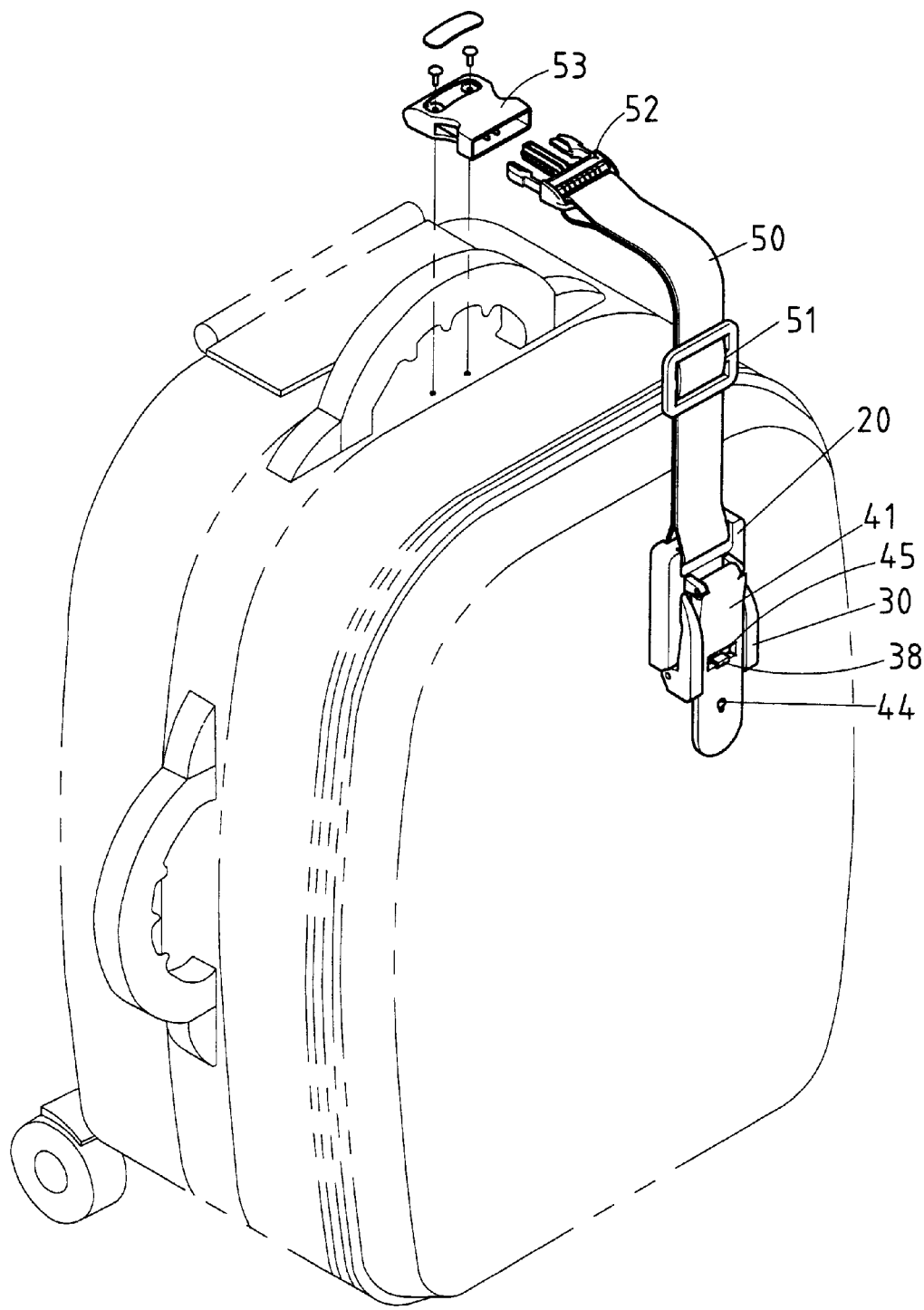
FIG. 7 shows a schematic view of the present invention at work.
Figure 8:
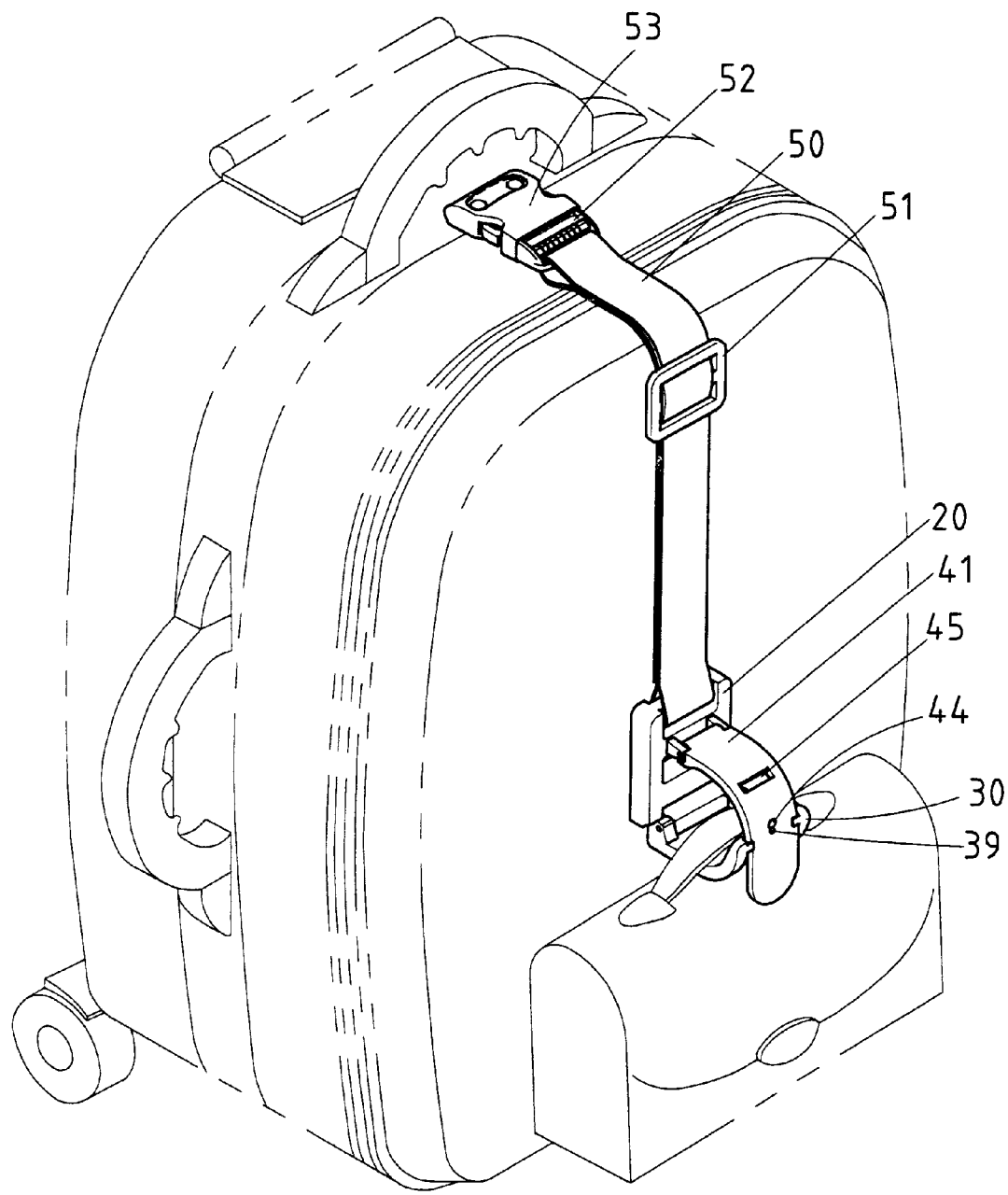
FIG. 8 shows another schematic view of the present invention at work.

As shown in FIGS. 7 and 8, the present invention further comprises a fabric belt 50 which is provided in the midsegment thereof with an adjusting member 51, and in other end thereof with a male retainer 52. A female retainer 53 is riveted to the luggage shell by a rivet 54.

Figure 2:
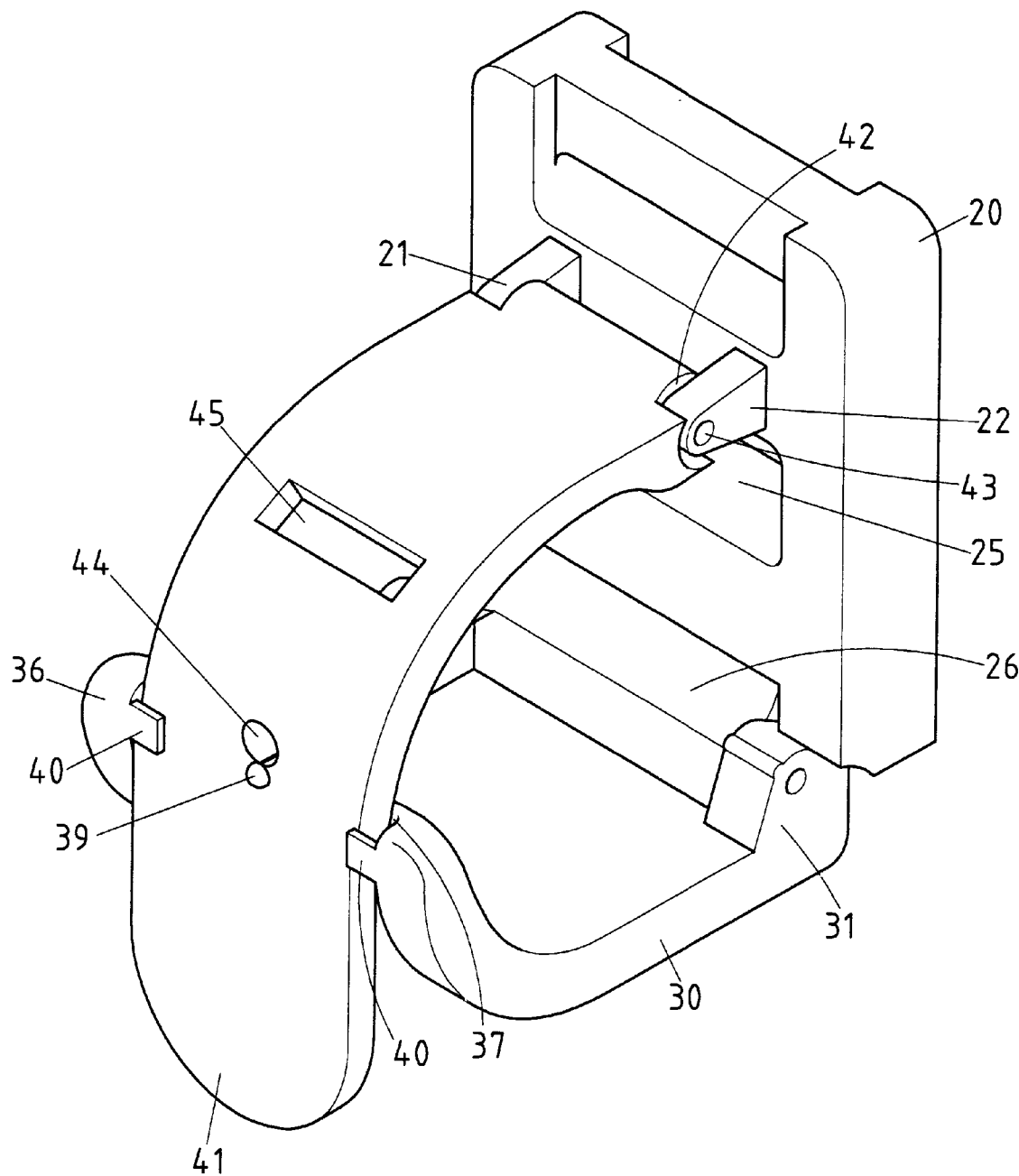
FIG. 2 shows a perspective view of the preferred embodiment of the present invention.
Figure 3:
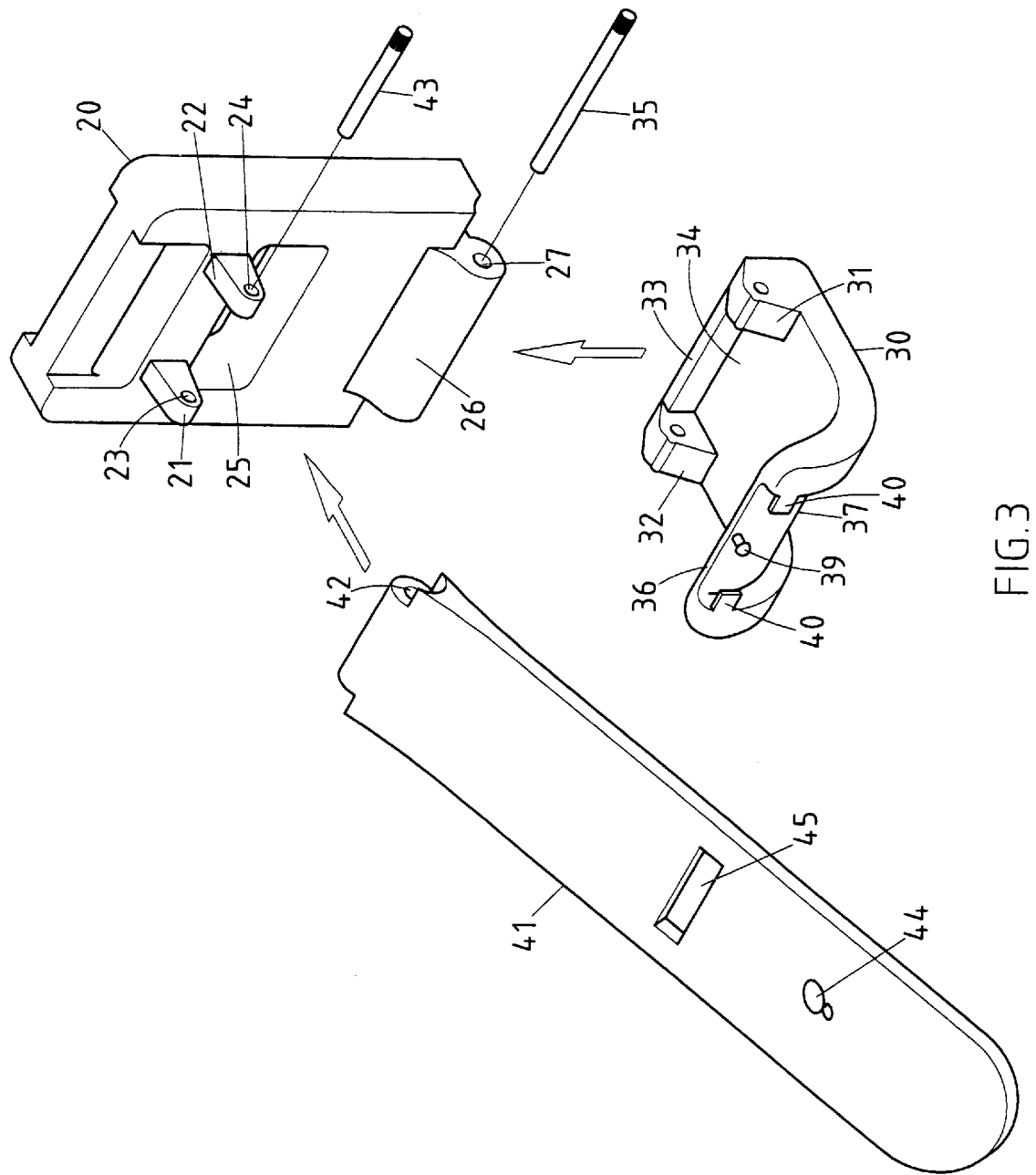
FIG. 3 shows an exploded view of the preferred embodiment of the present invention.
Figure 4:
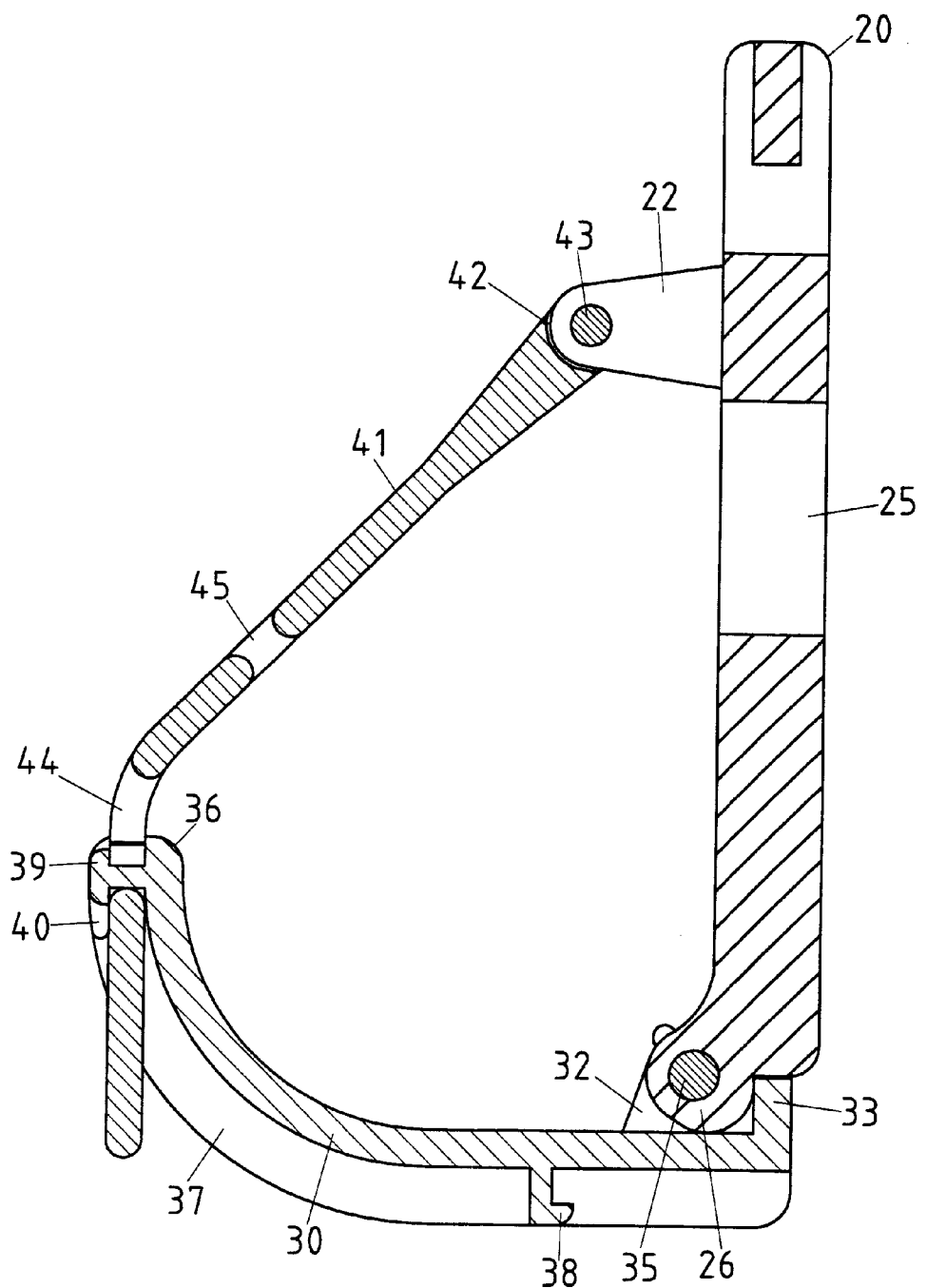
FIG. 4 shows a sectional schematic view of the preferred embodiment of the present invention.

As illustrated in FIGS. 2 and 4, the hooked plate 30 is swiveled downward to form an angle of 90 degrees with the base plate 20. An article can be retained by the hooked plate 30 such that the hook 39 of the hooked plate 30 is retained in the retaining hole 44 of the fastening piece 41, which is disposed in the recess 37 such that the fastening piece 41 is aligned by the two protruded edges 40.

Figure 5:
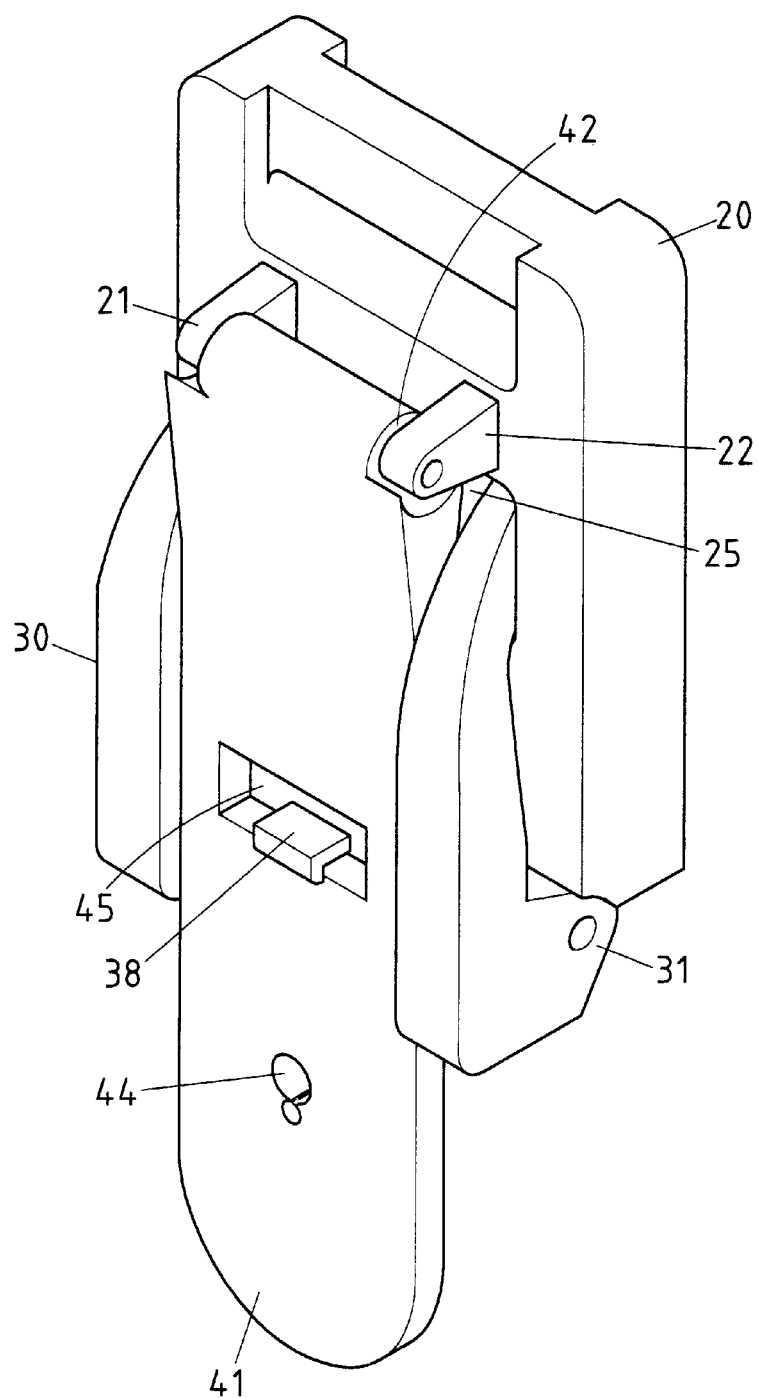
FIG. 5 shows a perspective view of the preferred embodiment of the present invention in the folded state.
Figure 6:
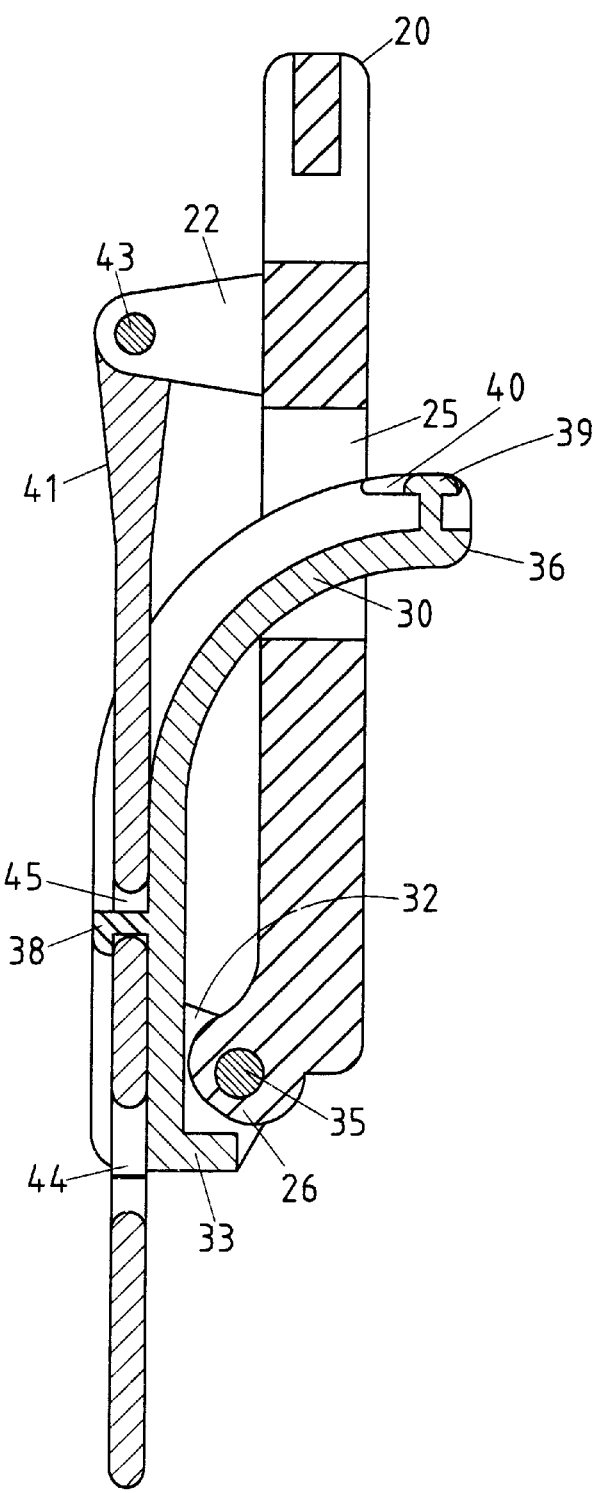
FIG. 6 shows a sectional schematic view of the preferred embodiment of the present invention in the folded state.

As shown in FIGS. 5 and 6, the present invention can be folded by disengaging the hook 39 of the hooked plate 30 with the retaining hole 44 of the fastening piece 41. Thereafter, the hooked plate 30 is moved toward the base plate 20 such that the hooked end 36 is inserted into the cross hole 25 of the base plate 20. The fastening piece 41 is put into the recess 37 of the underside of the hooked plate 30. The folding hole 45 serves to retain the retaining hook 38, so as to locate the hooked plate 30.

The embodiment of the resent invention described above is to be regarded in all respects as being merely illustrative and not restrictive. Accordingly, the present invention may be embodied in other specific forms without deviating from the spirit thereof. The present invention is therefore to be limited only by the scope of the following appended claims.

What is claimed is:

1. An article-retaining device fixed with the external side of a luggage for carrying an article along with the luggage, said device comprising:

a base plate provided in the proximity of a top thereof with two protruded blocks which are respectively provided with a through hole, said base plate further provided with a cross hole located under said protruded blocks, and a cross base block extending slantingly and downward, said cross base block being provided with a through hole;

a hooked plate provided in a top thereof with two seat blocks which are connected by a stop block so as to form a slot between said two seat blocks for accommodating said cross base block which is pivoted with said two seat blocks by a pivot, said hooked plate further provided with a hooked end and a recess, said hooked plate further provided in the underside with a retaining hook, said hooked plate further provided with a hook and a protruded edge; and a fastening piece provided with a tabular portion which is disposed between said two protruded blocks such that said fastening piece is pivoted with said two protruded blocks by a pivot, said fastening piece further provided with a retaining hole and a folding hole.

2. The article-retaining device as defined in claim 1 further comprising a fabric belt which is provided in the midsegment with an adjusting member, and in other end thereof with a male retainer, and a female retainer riveted to the luggage.

* * * * *